US010254879B1

(12) United States Patent
Oral et al.

(10) Patent No.: US 10,254,879 B1
(45) Date of Patent: Apr. 9, 2019

(54) TOUCH SCREEN PROXIMITY SENSING WITH ACCELEROMETER/GYROSCOPE AND FINGER GRIP SUPPRESSION TO PREVENT FALSE EAR TOUCH

(71) Applicant: Parade Technologies, Ltd., Santa Clara, CA (US)

(72) Inventors: Yesim Oral, Istanbul (TR); Patrick N Prendergast, Clinton, WA (US); Tayyar Guzel, Istanbul (TR)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 197 days.

(21) Appl. No.: 15/069,929

(22) Filed: Mar. 14, 2016

Related U.S. Application Data

(60) Provisional application No. 62/131,983, filed on Mar. 12, 2015.

(51) Int. Cl.
*G06F 3/041* (2006.01)
*G06F 3/044* (2006.01)
*G06F 3/0488* (2013.01)

(52) U.S. Cl.
CPC ............ *G06F 3/0416* (2013.01); *G06F 3/044* (2013.01); *G06F 3/04883* (2013.01); *G06F 2203/04108* (2013.01)

(58) Field of Classification Search
None
See application file for complete search history.

(56) References Cited

U.S. PATENT DOCUMENTS

| 2009/0241072 | A1* | 9/2009 | Chaudhri | G06F 3/04883 715/863 |
| 2014/0059489 | A1* | 2/2014 | Klask | G06F 3/017 715/825 |
| 2014/0085201 | A1* | 3/2014 | Carmel-Veilleux | G06F 1/1694 345/158 |
| 2015/0077140 | A1* | 3/2015 | Chu | G06F 3/044 324/658 |
| 2015/0109221 | A1* | 4/2015 | Wang | G06F 3/0488 345/173 |

\* cited by examiner

*Primary Examiner* — Matthew Yeung
(74) *Attorney, Agent, or Firm* — Morgan, Lewis & Bockius LLP

(57) ABSTRACT

The various implementations described herein include systems, methods and/or devices used to enable touch screen proximity sensing with suppression of false ear touches. An example method is performed at a touch sensitive device and includes enabling or disabling grip suppression to prevent false touches from a user's ear during a phone call based on signals from motion sensors, such as gyroscopes and/or accelerometers, that indicate a direction of the touch sensitive device with respect to a user's face. Another method is performed at a touch sensitive device and includes allowing a user to input on the touch screen a predefined gesture to enable normal touch operation of a touch screen of a touch sensitive device when the device is in a proximity sensing mode.

19 Claims, 8 Drawing Sheets

TOUCH SCREEN PROXIMITY SENSING WITH ACCELEROMETER/GYROSCOPE AND FINGER GRIP SUPPRESSION TO PREVENT FALSE EAR TOUCH

RELATED APPLICATIONS

This application claims priority to U.S. Provisional Application Ser. No. 62/131,983, filed Mar. 12, 2015, entitled "Touch Screen Proximity Sensing with Accelerometer/Gyroscope and Finger Grip Suppression to Prevent False Ear Touch," which is incorporated by reference herein in its entirety.

TECHNICAL FIELD

The disclosed implementations relate generally to touch-sensitive displays, and in particular, to proximity sensing on a touch-sensitive display.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of capacitance sensing. A capacitance sensing system may include a touch screen, touch-sensor pad, a touch-sensor slider, or touch-sensor buttons, and may include an array of one or more capacitive sensor elements (also referred to as sensor electrodes). Capacitive sensing typically involves measuring, through sensor signals (e.g., increases or decreases in electrode responses), a change in capacitance associated with the capacitive sensor elements to determine a presence/proximity of a conductive object (e.g., a user's finger or head) relative to the capacitive sensor elements. A goal of touch screen proximity sensing is to provide high proximity object detection distance (e.g., distance of an approaching head when a user is answering a phone call) and normal finger detection capability (e.g., normal use of the touch screen to interact with an electronic device) at the same time.

However, with high detection distance of proximity objects, there is a possibility that approaching fingers are detected as a proximity object. Thus, there is a need for touch screen devices that are able to discriminate between signals caused by approaching fingers and a proximity objects (such as a head). Another problem with proximity detection is that, if sensitivity is decreased to avoid confusing approaching fingers with a proximity object, an ear creates finger-like touch screen signals, so a fast approaching ear can be detected as a finger touch instead of part of a proximity object (e.g., a head).

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable touch screen proximity sensing.

Some implementations include a method for using finger grip suppression to suppress false finger reports caused by ear touch by adjusting the suppression zone to the area where an ear touch is more likely to happen. In some implementations, finger grip suppression is enabled in an area of the touch screen likely to be contacted by an ear (e.g., an upper side of a touch panel) when a user is on a phone call in response to signals from one or motion sensors, such as a gyroscope or accelerometers, indicating that the device is moving towards a user's face. Similarly, in some implementations, finger grip suppression is disabled in response to signals from one or motion sensors, such as a gyroscope or accelerometers, indicating that the device is moving away from a user's face.

In some implementations, touch screen proximity sensing or infrared proximity sensing is employed to place a device in proximity mode (e.g., to disable normal touch screen operation so as to prevent erroneous touch signals from caused by an ear during a phone call) and a pre-defined gesture is enabled by which a user of the device can transition the device from proximity mode to normal touch mode. For example, in some such implementations, the gesture is a vertical pan gesture with a pre-defined trajectory window, origination area, and minimum distance of travel on the screen. In some such implementations, the vertical pan gesture also has pre-defined velocity window.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

Figure 1:
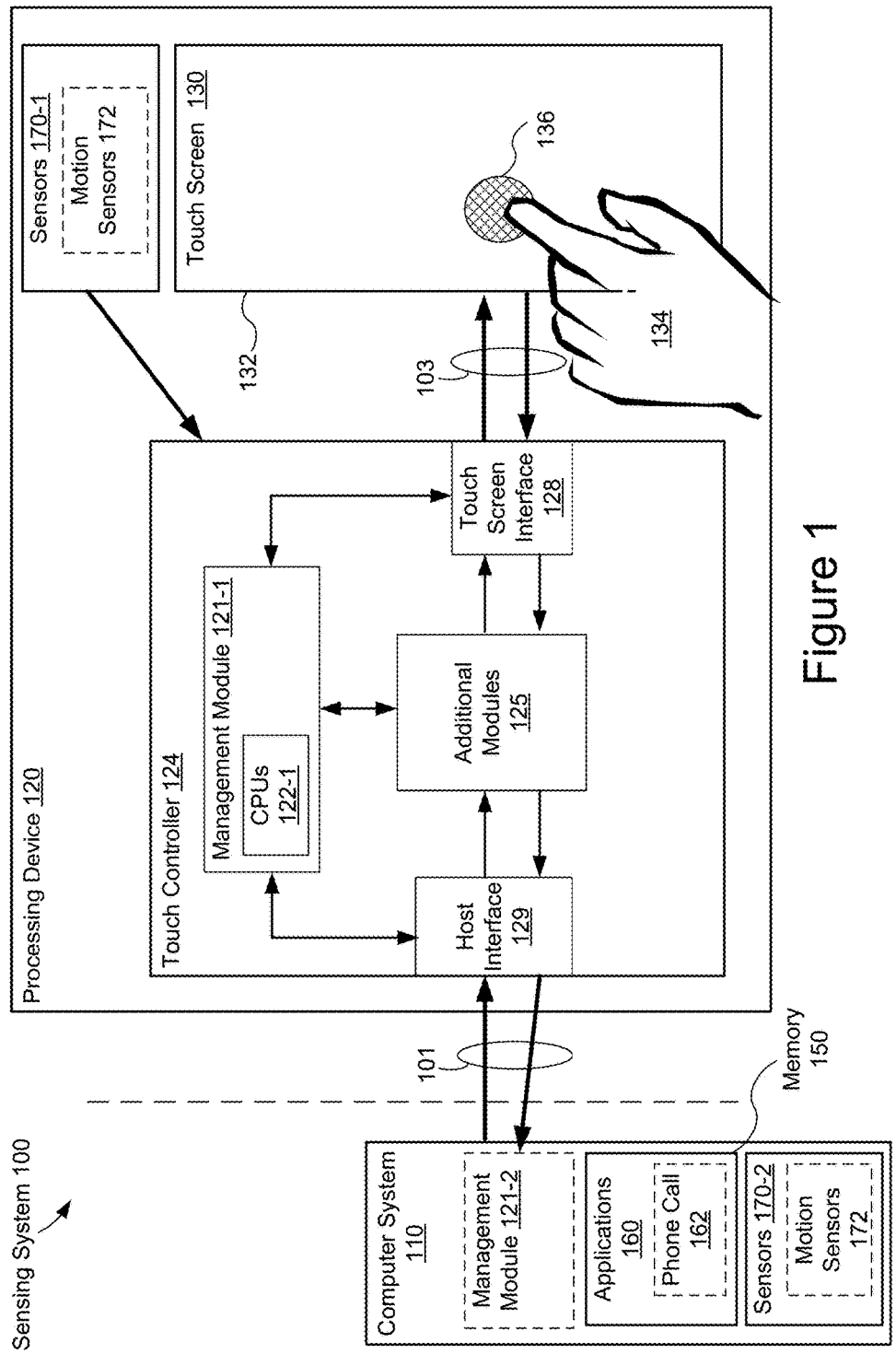
FIG. 1 is a block diagram illustrating a sensing system, in accordance with various implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

The various implementations described herein include systems, methods and/or devices for suppressing false finger reports caused by ear touches on touch screens during phone calls. These descriptions refer to various terms and abbreviations associated with capacitive touch panels and devices configured with touch screens, some of which are defined as follows:

Touchscreen Proximity Sensing: The purpose of proximity sensing is to detect a face as it approaches a touch screen during a phone call and then to close the LCD screen to save power and to prevent false touches that can be caused by the face. In some implementations, proximity sensing is initiated based on signals from an IR sensor that detects the approach of a proximity object, such as a head. Proximity sensing can also be done without additional sensors, as is the case with "touch screen proximity sensing," which refers to face detection performed using signals from the existing touch screen rather than an extra IR sensor.

TSC: Touch Screen Controller

FW: Firmware

IR: Infrared Proximity Sensor

Accelerometer: An accelerometer is an electromechanical sensor that measures the static (constant force of gravity) or dynamic (caused by moving or vibrating the accelerometer) acceleration forces.

Gyroscope: A gyroscope is a sensor that determines orientation using the Earth's gravity. A gyroscope indicates which way is down with respect to gravity.

FW Grip Suppression: Grip suppression suppresses reporting of touches within a user defined area. In some implementations, grip suppression filters out detected fingers in the pre-defined area while leaving normal performance for other parts of the panel. A main purpose of the grip suppression feature is to prevent unintended finger touches caused by gripping the phone.

Some implementations include a method for using finger grip suppression to suppress false finger reports caused by ear touches by adjusting the grip suppression zone to the area where ear touches are more likely to happen. In some implementations, finger grip suppression is enabled in an area of the touch screen likely to be contacted by an ear (e.g., an upper side of a touch panel) when a user is on a phone call in response to signals from one or motion sensors, such as a gyroscope or accelerometers, indicating that the device is moving towards a user's face. Similarly, in some implementations, finger grip suppression is disabled in response to signals from one or motion sensors, such as a gyroscope or accelerometers, indicating that the device is moving away from a user's face.

In some implementations, touch screen proximity sensing or infrared proximity sensing is employed to place a device in proximity mode (e.g., to disable normal touch screen operation so as to prevent erroneous touch signals from caused by an ear during a phone call) and a pre-defined user touch gesture is enabled by which a user of the device can transition the device from proximity mode to normal touch mode. For example, in some such implementations, the gesture is a vertical pan gesture with a pre-defined trajectory window, origination area, and minimum distance of travel on the screen (e.g., a finger swipe from the top to the bottom of a touch screen). In some such implementations, the vertical pan gesture also has pre-defined velocity window.

In some implementations, one or more performance problems of prior proximity detection systems are addressed: 1) reduced proximity detection performance; 2) ear touch to the screen intermittently creates finger reports instead of proximity report; and 3) approaching fingers intermittently create a proximity report instead of a finger report.

Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, sensing system 100 includes a processing device 120 (also sometimes called a touch sensitive device), which includes a touch controller 124 and a touch screen 130 (also sometimes called a touch sensitive display), and is used in conjunction with or includes a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input. In some implementations, the touch screen provides the functionality of a proximity sensor.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some implementations, the computer system 110 includes a memory 150 that stores applications 160 that provide end user functionality, including a phone call application 162 that enables a user to make, answer and participate in phone calls. In some implementations, the computer system 110 includes a variety of sensors 170-2, including one or more infrared sensors and one or more motion sensors 172, such as gyroscopes and/or accelerometers. In some implementations, the processing device 120 also includes sensors 170-1 in addition to the touch screen 130, including one or more infrared sensors, and one or more motion sensors 172, such as gyroscopes and/or accelerometers. In some implementations, it is not necessary to use both accelerometer and gyroscope as the same or similar performance can be achieved by using only one of the sensors.

The touch screen 130 is coupled to the touch controller 124 through the connections 103. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., a capacitive sense array) that forms a touch sensitive display. In some implementations, the sensing array 132 includes one or more of light-sensitive elements, light emitting elements, photosensitive elements, pressure sensitive elements, and/or capacitive sensor elements (also referred to as sensor electrodes). The capacitive sensor elements are electrodes of conductive material, such as copper. The sensing array 132 is sensitive to an input object 134 at a location 136 (e.g., a user's finger or rain droplets). In some implementations, the input object 134 is a user's head.

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., random access memory and/or flash memory). In some implementations, the memory module stores detected electrode responses, electrode response criteria, previously determined baselines, and the like. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2:
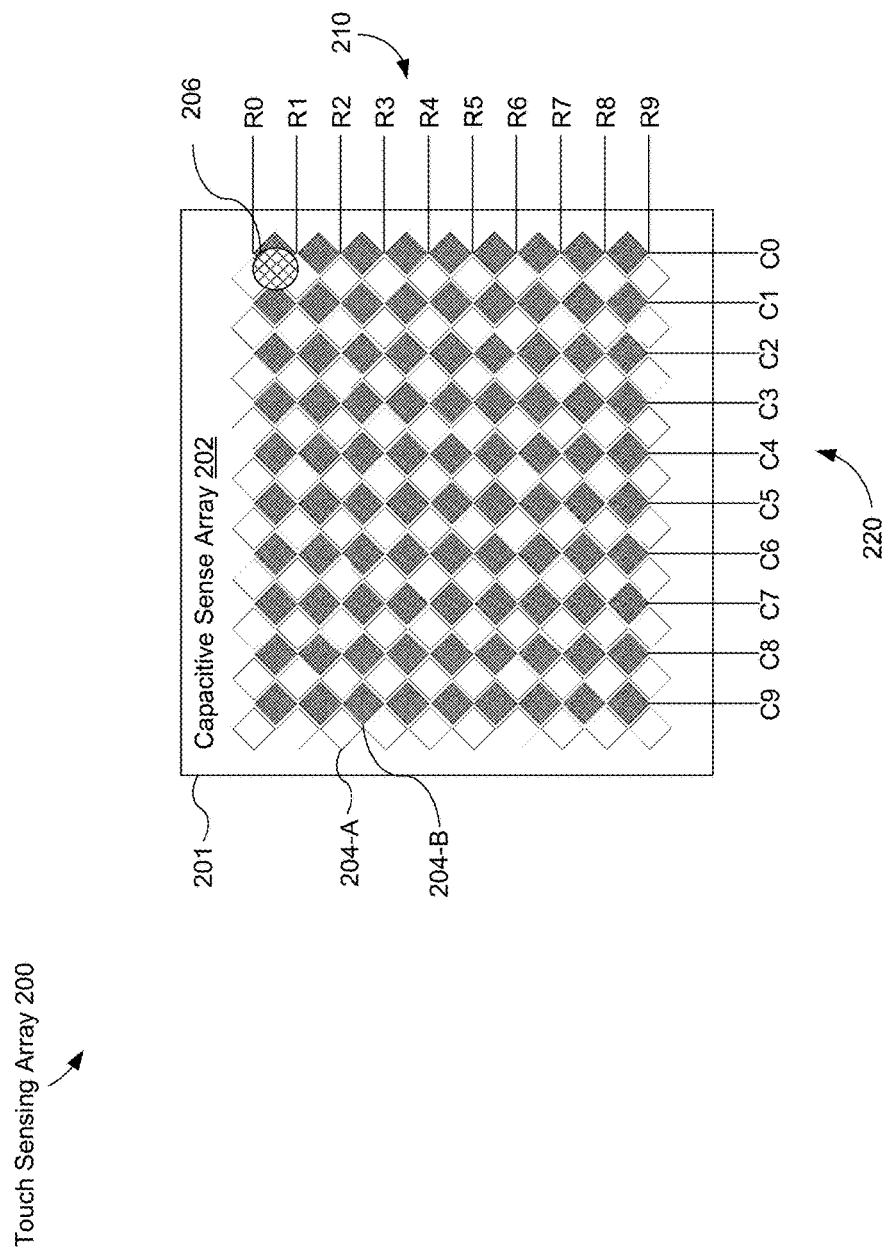
FIG. 2 is a diagram illustrating a touch sensing array including a substrate having a capacitive sense array (e.g., a touch screen), in accordance with various implementations.

FIG. 2 is a diagram illustrating a touch sensing array 200 (e.g., touch screen 130, FIG. 1) including a substrate 201 (e.g., a dielectric material) having a capacitive sense array 202 (e.g., sensing array 132, FIG. 1), in accordance with various implementations. As shown, FIG. 2 includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., management module 121-1, FIG. 1). In the operations described in more detail below, each of the rows R0-R9 210 and columns C0-C9 220 of sensor elements may operate as both transmit and receive electrodes.

In some implementations, the plurality of sensor electrodes 204 includes both self-capacitance sensors and mutual-capacitance sensors. Within the capacitive sense array 202, each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9

210 are associated with a Y-coordinate or range of Y-coordinates of the X-Y plane. In this way, the sensing module (e.g., management module 121-1, FIG. 1) can determine a location (e.g., touch location 136, FIG. 1) of a touch 206 on the capacitive sense array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

In some implementations, a processing device (e.g., processing device 120, FIG. 1) or one or more components of the processing device (e.g., management module 121-1, FIG. 1) measures capacitance of the plurality of sensor electrodes 204 using self-capacitance sensing. In some implementations, self-capacitance sensing measures added (or subtracted) capacitance at each of the plurality of sensor electrodes 204. For example, a user's touch (e.g., a finger) at a specific sensor electrode (e.g., sensor electrode 204-A) increases capacitance at the specific sensor electrode because the finger's capacitance is added to the capacitance of the specific sensor electrode. The processing device detects a "touch" when the added capacitance to the specific sensor electrode, relative to a baseline, exceeds a predefined threshold. Alternatively, water (e.g., rain droplets) at a specific sensor electrode (e.g., sensor electrode 204-A) decrease capacitance at the specific sensor electrode because water causes a decrease in capacitance of the specific sensor electrode. The processing device, however, will trigger a response when the subtracted capacitance to the specific sensor electrode, relative to a baseline, exceeds a predefined threshold.

In some implementations, the processing device measures capacitance of the plurality of sensor electrodes 204 using mutual-capacitance sensing. In some implementations, mutual-capacitance sensing measures capacitance between a column electrode (e.g., a transmitter (TX) electrode), and a row electrode (e.g., a receiver (RX) electrode). For example, mutual-capacitance sensing measures a change (e.g., a decrease or increase) in capacitance between the column electrode (e.g., sensor electrode 204-A) and the row electrode (e.g., sensor electrode 204-B) resulting from a user's touch (e.g., a finger).

Figure 3:
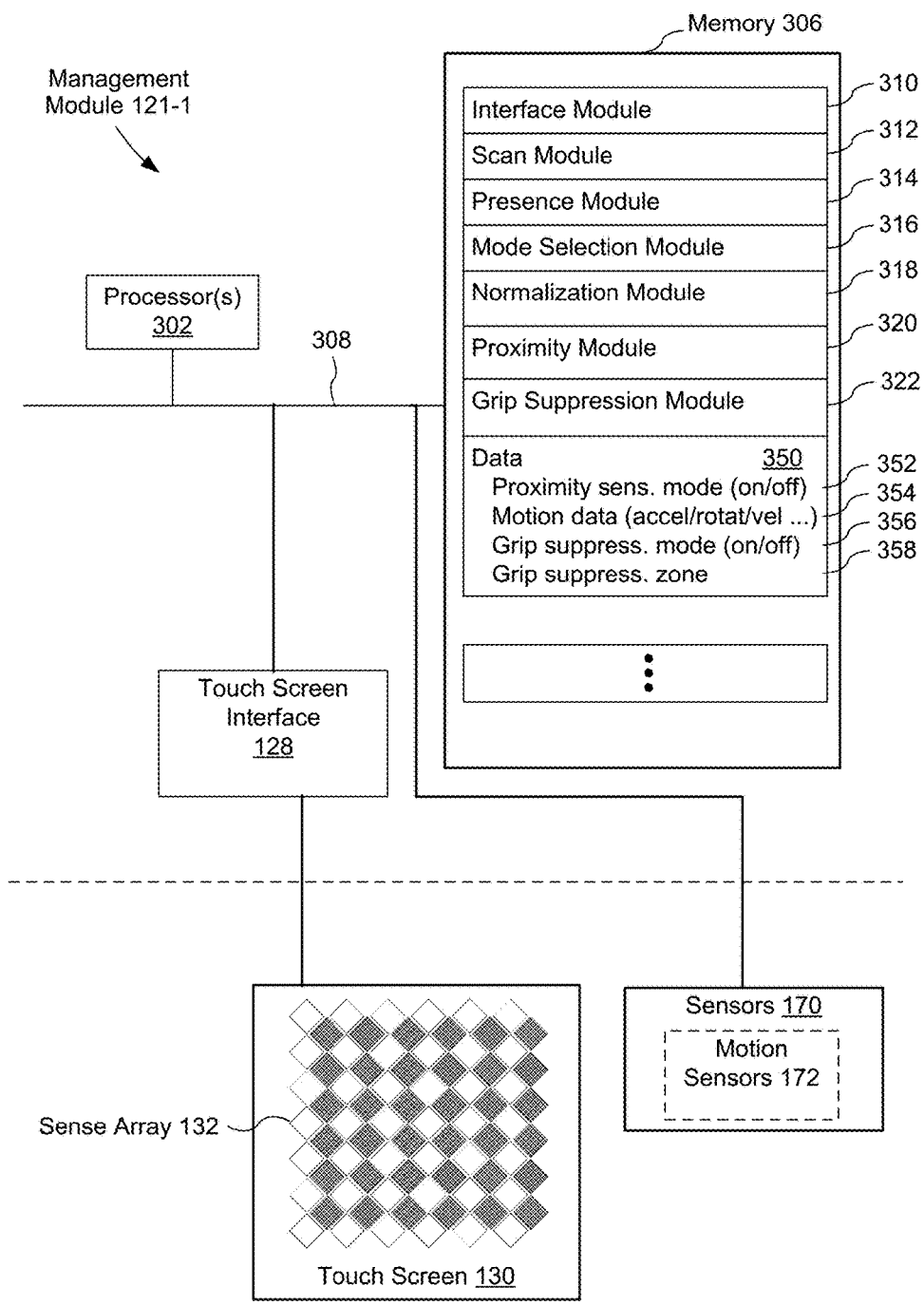
FIG. 3 is a block diagram illustrating an implementation of a management module (e.g., the management module 121-1 shown in FIG. 1).

FIG. 3 is a block diagram illustrating an implementation of a management module (e.g., management module 121-1, FIG. 1). The management module 121-1 typically includes one or more processing units 302 (sometimes herein called CPUs, processors, or hardware processors, and sometimes implemented using microprocessors, microcontrollers, or the like) for executing modules, programs and/or instructions stored in memory 306 and thereby performing processing operations, memory 306 and one or more communication buses 308 for interconnecting these components. The communication buses 308 optionally include circuitry (sometimes called a chipset) that interconnects and controls communications between system components. In some implementations, the management module 121-1 is coupled to a touch screen (e.g., touch screen 130, FIG. 1, and in turn, sense array 132) by the communication buses 308 and the touch screen interface 128. In some implementations, the memory 306, or the computer readable storage medium of the memory 306 stores the following modules and data used by the modules:

an interface module 310 that is used for communicating with other components of the electronic device.
a scan module 312 that is used to convert sensor signals (e.g., convert analog signals, such as voltage and/or change, into digital signals, or vice versa);
a presence module 314 that is used to detect presence of a conductive object (e.g., a user's finger and/or a liquid), or lack of a conductive object; a mode selection module 316 that is used to select a mode of operation of the electronic device based on electrode responses from the capacitive sense array (e.g., enable or disable a proximity sensing mode and/or a grip suppression mode);
a normalization module 318 that is used to normalize electrode responses from the capacitive sense array (i.e., establish a new baseline).
a proximity module 320 that is used to detect proximity of user's face (e.g., when the user is making a phone call by holding a mobile handset next to his or her face).
a finger grip suppression module 318 that suppresses responses to detected touches in defined regions of the touch screen 130. In some implementations, the finger grip suppression module 322 is implemented in firmware of the touch controller 124 to improve proximity performance and is host configurable based on host definition of suppression mode and/or zone parameters 358 as described below. Note that if the touch controller 124 (or firmware thereof) does not support finger suppression operations, to provide the same or similar performance, the host (e.g., computer system 110) can suppress touch reports from a pre-defined area corresponding to the suppression zone in which the finger grip suppression module 318 would, if enabled, suppress touch responses.
data 350 used by the above modules, which includes in some implementations one or more of:
proximity sensing mode 352 (e.g., ON or OFF);
motion data 354 from motion sensors (e.g., one or more of acceleration, rotation and velocity data for the computer system 110/handheld device as reported by the motion sensors 172);
grip suppression mode 356 (ON or OFF)
grip suppression zone 358 (e.g., coordinates of a region of the sense array in which touch signals are suppressed)

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

In some implementations, the mode selection module 316 includes algorithms that determine (alone or in combination with other modules and/or programs of the sensing system 100) when to enable finger grip suppression (e.g., using finger grip suppression module 322) to suppress false finger reports caused by ear touches. In some implementations, grip suppression is enabled when a user is on a phone call in response to signals from one or motion sensors 172, such as a gyroscope or accelerometers, indicating that the device is moving towards a user's face. Similarly, in some implementations, finger grip suppression is disabled in response to signals from one or motion sensors 172, indicating that the device is moving away from a user's face. In some implementations, based on a starting device orientation, accelerometer and/or gyroscope readings can be used to favor proximity object detection in a vertical orientation (e.g., a device orientation commonly used to answer a phone call) and it may favor finger detection in horizontal orientation (e.g., a device orientation commonly used for text entry applications).

In some implementations, the mode selection module 316 includes algorithms that employ touch screen proximity sensing or infrared proximity sensing (alone or in combination with other modules and/or programs of the sensing system 100) to place a device in proximity mode (e.g., to disable normal touch screen operation so as to prevent erroneous touch signals from caused by an ear during a phone call) without signals from an additional sensor (e.g., using only signals from the touch sensing array 132). In some implementations, the mode selection module 316 is responsive to a pre-defined gesture by which a user of the electronic device can transition the device from proximity mode (wherein normal touch operation is suppressed for the entire panel) to normal touch mode.

Figure 4:
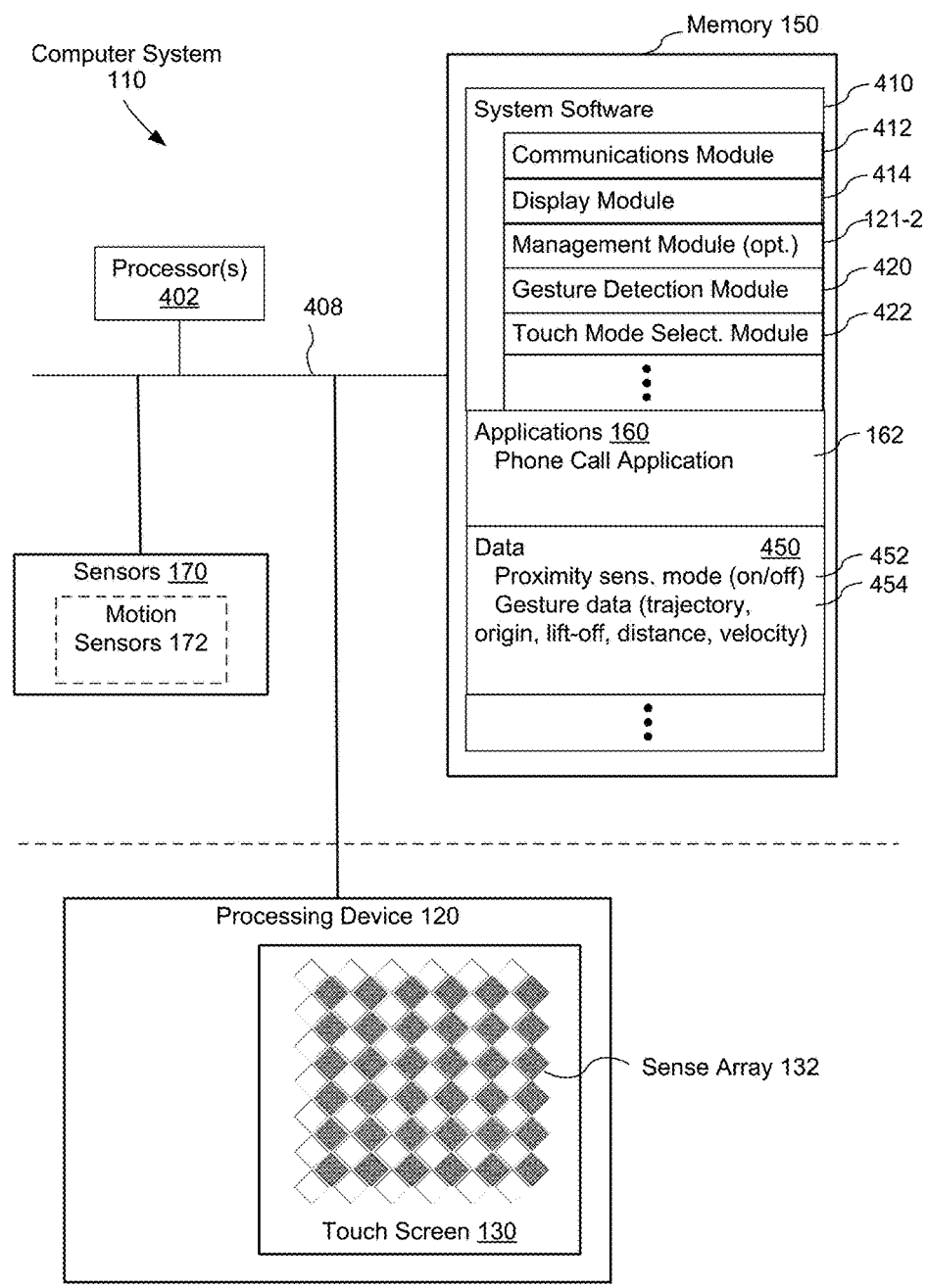
FIG. 4 is a block diagram illustrating an implementation of a computer system (e.g., the computer system 110 of FIG. 1).
Figure 5:
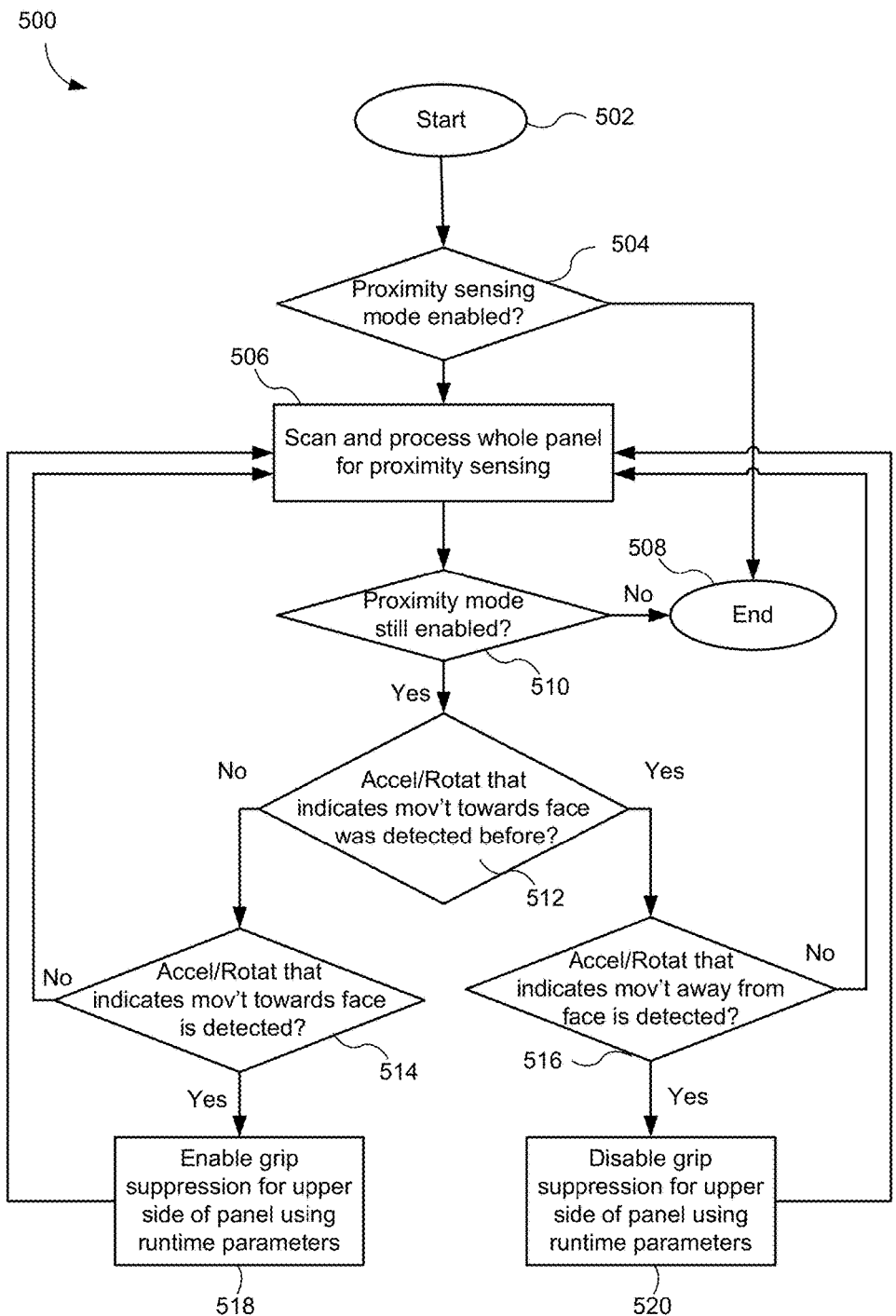
FIG. 5 is a conceptual flowchart of a method of selectively disabling and enabling grip suppression for a capacitive sense array in response to motion signals in accordance with some implementations.

In some implementations, suppression of false ear touches as described herein is performed by a host (e.g., the computer system 110) as part of a driver (e.g., a component of system software 410 of FIG. 4) or a user space application (e.g., the phone call application 162 of FIGS. 1 and 4). This implementation presumes that the host has access to both the TSC (touch screen controller) and accelerometer and gyroscope hardware. This solution in some implementations requires no change to existing TSC firmware (FW) when the current FW supports the configurability that is needed by this solution. The flow of a method that can be followed by a host processor (or other implementations as described herein) is depicted in the flowchart of FIG. 5.

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores detected electrode responses, electrode response criterions, previously determined baselines, additional touch processing algorithms, and other relevant information. In some implementations, the programs, modules, and data structures stored in memory 306, or the computer readable storage medium of the memory 306, provide instructions for implementing respective operations in the methods described below with reference to FIGS. 5 and 6. In some implementations, one or more of the programs, modules, and data structures stored in memory 306 are stored in the memory 150 of the computer system 110, or the computer readable storage medium of the memory 150, for implementing within the computer system 110 respective operations described below with reference to FIGS. 5 and 6.

FIG. 4 is a block diagram illustrating an implementation of a computer system (e.g., the computer system 110 of FIG. 1). The computer system 110 typically includes one or more processing units 302 (sometimes herein called CPUs, processors, or hardware processors, and sometimes implemented using microprocessors, microcontrollers, or the like) for executing modules, programs and/or instructions stored in memory 150 and thereby performing processing operations, memory 150 and one or more communication buses 408 for interconnecting these components. The communication buses 408 optionally include circuitry (sometimes called a chipset) that interconnects and controls communications between system components. In some implementations, the computer system 110 is coupled to a touch screen (e.g., touch screen 130, FIG. 1, and in turn, sense array 132) by the communication buses 308 and the touch screen interface 128. In some implementations, the memory 150, or the computer readable storage medium of the memory 150 stores the following modules and data used by the modules:

system software 410 that controls operations of the computer system 110, including (but not limited to) one or more of:
  a communications module 412 for controlling wired and wireless communications of the computer system 110;
  a display module 414 for managing information display by the computer system 110 (including information displayed on the touch screen 130);
  a touch screen management module 121-2 that optionally performs one or more operations of and/or stores one or more programs, modules and data structures of the management module 121-1 described with reference to FIG. 3;
  a gesture detection module 420 that identifies pre-defined user gestures in response to signals received from the processing device 120 representative of user interactions with the touch screen 130; and
  A touch mode selection module 422 that transitions the touch screen 130 to a normal touch mode during a call (when it is in proximity mode) in response to a predefined user gesture.
applications 160, including a phone call application 162.
data 450 used by the above modules, which includes in some implementations one or more of:
  proximity sensing mode 452 (e.g., ON or OFF); and
  gesture data 454 (trajectory, origin of gesture, gesture lift-off position, gesture distance, gesture velocity)—used to detect the predefined gesture for transitioning the touch screen 130 to a normal touch mode.

Each of the above identified elements may be stored in one or more of the previously mentioned memory devices that together form the memory 150, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 150 may store a subset of the modules and data structures identified above. Furthermore, the memory 150 may store additional modules and data structures not described above. For example, in some implementations, the memory 150 stores detected electrode responses, electrode response criterions, previously determined baselines, other touch and gesture processing algorithms, additional system and application software modules, and other relevant information. In some implementations, the programs, modules, and data structures stored in memory 150, or the computer readable storage medium of the memory 150, provide instructions for implementing respective operations in the methods described below with reference to FIGS. 5 and 6. In some implementations, one or more of the programs, modules, and data structures stored in memory 150 are stored in the memory 306 of the processing device 120, or the computer readable storage medium of the memory 306, for implementing within the processing device 110 respective operations described below with reference to FIGS. 5 and 6.

FIG. 5 is a conceptual flowchart of a method of selectively disabling and enabling grip suppression for a capacitive sense array in response to motion signals in accordance with some implementations. With reference to the sensing system 100 pictured in FIG. 1, in some implementations, a method 500 is performed by a processing device (e.g., processing device 120, FIG. 1) or one or more components of the processing device (e.g., touch controller 124). In some implementations, the method 500 is governed by instructions that are stored in a non-transitory computer-readable storage medium and that are executed by one or more processors of a device (e.g., a touch sensitive device), such as the one or more processing units (CPUs) 122-1 of the management module 121-1 (FIG. 1).

In some implementations, some of the operations (or alternatively, steps) of method 500 are performed at a host system (e.g., computer system 110) that is operatively coupled with the processing device 120 and other operations of method 500 are performed at the processing device 120. In some of these implementations, the method 500 is governed, at least in part, by instructions that are stored in a non-transitory computer-readable storage medium and that are executed by one or more processors (e.g., computer system 110) of the host system.

For ease of explanation, the following describes method 500 as performed by the processing device (also referred to as touch device or touch sensitive device) (e.g., processing device 120, FIG. 1). With reference to FIG. 3, in some implementations, the operations of method 500 are performed, at least in part, by a scan module (e.g., scan module 312, FIG. 3), a presence module (e.g., presence module 314, FIG. 3), a mode selection module (e.g., mode selection module 316, FIG. 3), a proximity module (e.g., a proximity module 320) and a grip suppression module (e.g., a grip suppression module 322) or a program that embodies one or more functions of these modules.

As noted above, a challenge of touch screen proximity sensing is to provide high proximity detection distance and normal finger detection capability at the same time. With high detection distance (e.g., when a proximity object such as a face can be detected when it is relatively far from a touch screen 130), there is a possibility that approaching fingers are detected as a proximity object as a trade-off. To reduce likelihood of this happening, in some implementations, touch screen modules (e.g., modules implemented in firmware (FW)) are able to discriminate signals caused by approaching fingers from those caused by an approaching proximity object.

Some implementations accomplish this by employing finger grip suppression to suppress false finger reports caused by ear touches by adjusting the suppression zone to an area where an ear touch is more likely to happen—e.g., the top of the panel during a phone call. Meanwhile (e.g., while normal touch operation for a portion of the touch screen is suppressed), the usual proximity scanning and processing continues for the whole panel and, in the event that a proximity object is detected (e.g., by the proximity module 320, FIG. 3), the usual proximity scanning processes report proximity object detections even if finger reports have been suppressed.

As users might consider it unacceptable to have a number of sensors (e.g., the sensors in the grip suppression zone) suppressed whenever the proximity sensing mode is enabled (e.g., any time when the phone call application 162 is active), in some implementations grip suppression is engaged intelligently, based on user interactions with the phone. For example, a user may want to use the suppressed area of the panel (e.g., the top portion of the panel) to access a drop-down menu to check notifications during a call (when the phone would typically be placed in proximity sensing mode). Thus, in some implementations, finger grip suppression is enabled when the phone (or other touch screen device) is moving towards the face and disabled when the phone is removed from the face. In some implementations, readings from the accelerometer and gyroscope sensors in the phone are used to identify motion towards and away from a user's face. In some implementations, a host device (e.g., the computer system 110) is configured to set suppression zones, and enable/disable finger grip suppression at runtime via parameters (e.g., the data 350 (FIG. 3) and 450 (FIG. 4)). In some implementations, one or more touch screen proximity settings can be defined via the touch screen controller 124, using memory (e.g., RAM) parameters for this purpose.

Thus, in accordance with some implementations, the sensing system 100 (e.g., one or more of the host 110 or the processing device 120) is enabled to access readings from accelerometer and/or gyroscope sensors to enable/disable finger grip suppression according to the phone's orientation and movement whenever the proximity sensing mode is enabled. One implementation of this mechanism is explained below with reference to FIG. 5.

The method begins (502) when the processing device 120 determines (504) whether proximity sensing mode is enabled for a sensing device/system 100. If proximity sensing mode is not enabled (504—No), the method ends (508).

Next, if proximity sensing is enabled (504—Yes), the processing device scans and processes the entire panel 132 for proximity sensing (e.g., determines whether a proximity object is near the panel) (506). Next, if proximity mode is still enabled (510—Yes), information from the motion sensors 172 (e.g., rotation, acceleration, etc.) is accessed to determine whether signals that indicate movement towards a face were previously detected (512). If not (512—No), information from the motion sensors 172 (e.g., rotation, acceleration, etc.) is accessed to determine whether those signals indicate current detection of movement towards a face (514). If yes (514—Yes), then grip suppression is enabled for a pre-defined portion of the touch panel. In some implementation, the predefined portion of the touch panel is defined using runtime parameters stored by the computer system 110 or the processing device 120. In some implementations, the predefined portion of the panel that is suppressed is a top or upper portion of the panel (e.g., see FIG. 7B). If not (514—No), then execution of the method returns to operation 506.

If information from the motion sensors 172 (e.g., rotation, acceleration, etc.) indicates that signals that indicate movement towards a face were previously detected (512—Yes), information from the motion sensors 172 (e.g., rotation, acceleration, etc.) is accessed to determine whether those signals indicate current detection of movement away from a face (516). If yes (516—Yes), then grip suppression is disabled for a pre-defined portion of the touch panel. In some implementation, the predefined portion of the touch panel is defined using runtime parameters stored by the computer system 110 or the processing device 120. In some implementations, the predefined portion of the panel that is suppressed is a top or upper portion of the panel (e.g., see FIG. 7B). If Not (516—No), execution of the method returns to operation 506.

Figure 7A:
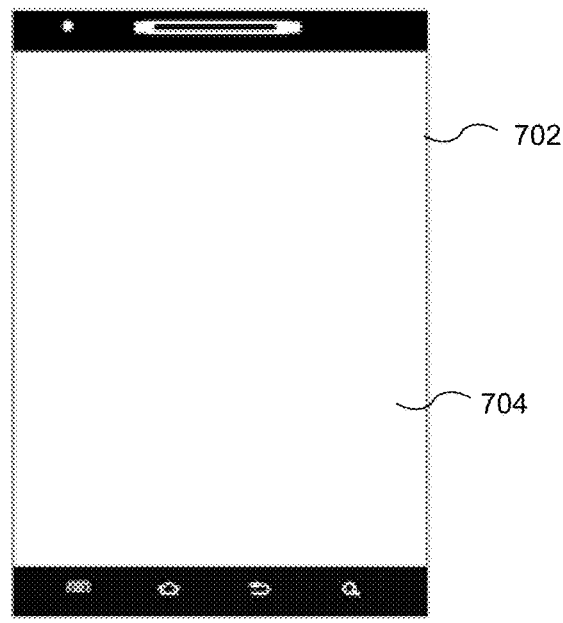
FIG. 7A is a conceptual view of a display and user interface of a capacitive touch screen device when finger suppression is not engaged in accordance with the method of FIG. 5.

FIG. 7A is a conceptual view of a display 702 and user touch screen interface 704 of a capacitive touch screen device 700 (e.g., corresponding to the sensing system 100) when finger grip suppression is not engaged in accordance with the method of FIG. 5. In particular, FIG. 7A shows that finger grip suppression is disabled (e.g., when the device 700 is in proximity sensing mode) for the entire touch screen user interface 704 when there is no movement towards the face as indicated by one or more of the motion sensors 172 (e.g., in accordance with operations 516 (516—Y) and 520 of FIG. 5).

Figure 7B:
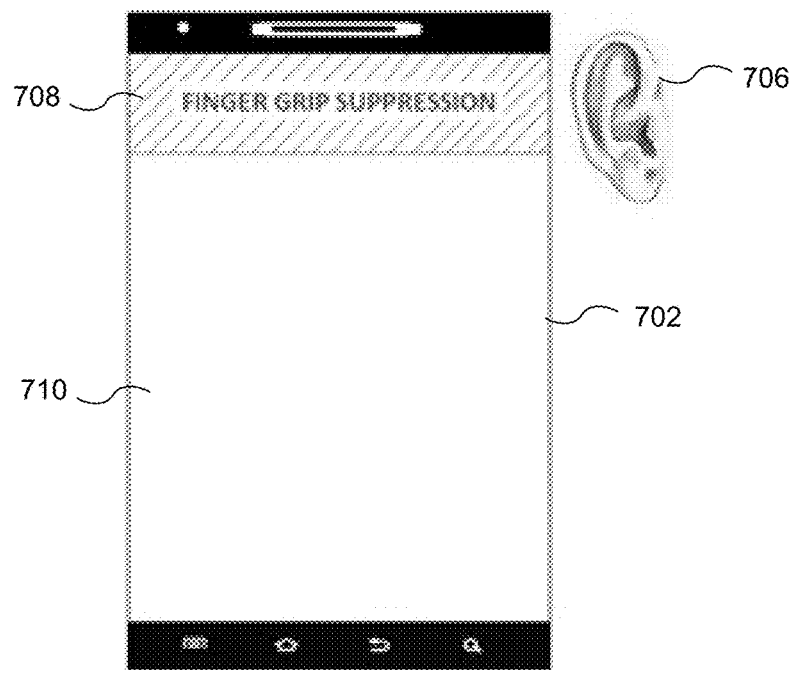
FIG. 7B is a conceptual view of a display and user interface of a capacitive touch screen device when finger suppression is engaged in a region likely to be contacted by an ear in accordance with the method of FIG. 5.

FIG. 7B is a conceptual view of a display 702 and user touch screen interface 704 of a capacitive touch screen device when finger suppression is engaged in a region 708 likely to be contacted by an ear 706 in accordance with the method of FIG. 5. In particular, FIG. 7B shows that finger grip suppression is enabled (e.g., when the device 700 is in proximity sensing mode) for a portion 708 of the touch screen user interface 704 when there is movement towards the face as indicated by one or more of the motion sensors 172 (e.g., in accordance with operations 514 (514—Y) and 518 of FIG. 5).

Figure 6:
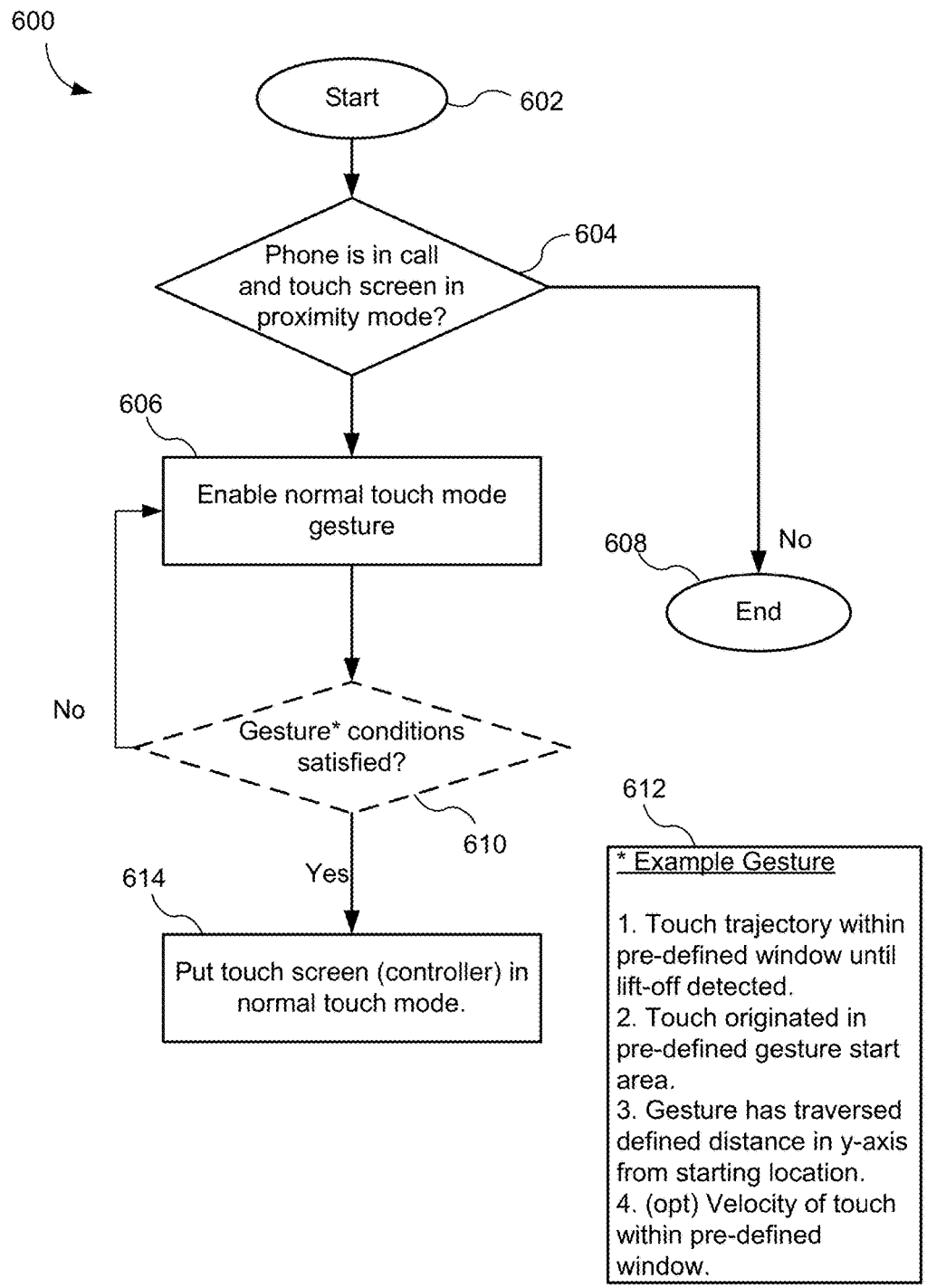
FIG. 6 is a conceptual flowchart of a method of selectively enabling normal touch screen operation in response to a touch gesture for a capacitive sense array in accordance with some implementations.

FIG. 6 is a FIG. 6 is a conceptual flowchart of a method of selectively enabling normal touch screen operation in response to a touch gesture for a capacitive sense array in accordance with some implementations. With reference to the sensing system 100 pictured in FIG. 1, in some implementations, a method 600 is performed by a processing device (e.g., processing device 120, FIG. 1) or one or more components of the processing device (e.g., touch controller 124). In some implementations, the method 600 is governed by instructions that are stored in a non-transitory computer-readable storage medium and that are executed by one or more processors of a device (e.g., a touch sensitive device), such as the one or more processing units (CPUs) 122-1 of the management module 121-1 (FIG. 1).

In some implementations, some of the operations (or alternatively, steps) of method 600 are performed at a host system (e.g., computer system 110) that is operatively coupled with the processing device 120 and other operations of method 600 are performed at the processing device 120. In some of these implementations, the method 600 is governed, at least in part, by instructions that are stored in a non-transitory computer-readable storage medium and that are executed by one or more processors (e.g., computer system 110) of the host system.

For ease of explanation, the following describes method 600 as performed by a host system (e.g., a computer system 110) with support from a touch processing device (e.g., processing device 120 of FIG. 1). With reference to FIG. 4, in some implementations, the operations of method 500 are performed, at least in part, by host software, such as system software 410 (including the gesture detection module 420 and the touch mode selection module 422) and applications 160 (including the phone call application 162) with support from one or more program modules of the memory 306 (see FIG. 3 and above descriptions) or a program that embodies one or more functions of these modules.

The implementation of FIG. 6 illustrates a method in which a touchscreen-only solution is implemented using pre-defined gestures that originate in a designated part of the touch screen. This gesture is only enabled when the phone is in a call and the touchscreen is in proximity mode (typically this only happens in the phone-call application). The method 600 starts (602) when the phone is in a call and the touch screen is in proximity mode (604—Yes). When this is the case, the host enables a normal touch mode gesture that can be used to enable normal touch screen operation even though the touch screen is in proximity mode (606). Next, gesture processing (e.g., gesture detection module 420 of FIG. 4) of the host detects whether one or more gesture conditions (or heuristics) of the predefined gesture have been satisfied (610). For example, one or more heuristics can be selected to avoid false gesture detection (of the pre-defined gesture) due to contact from ear, cheek, gripping fingers, wet hair, etc. In some implementations, the following heuristics are associated with detection of the predefined gesture:

1. The touch trajectory must stay within the pre-defined window until a lift-off is detected;
2. The touch must originate in the pre-defined gesture start area;
3. The gesture must traverse a pre-defined distance in the y-axis from the starting location;
4. (Optionally) The velocity of the touch must be within a pre-defined window.

When gesture conditions are satisfied (510—Yes), the host transitions the touch screen to normal touch mode (e.g., via instructions sent to the touch screen controller). An example predefined gesture is now described with respect to FIGS. 8A and 8B.

Figure 8A:
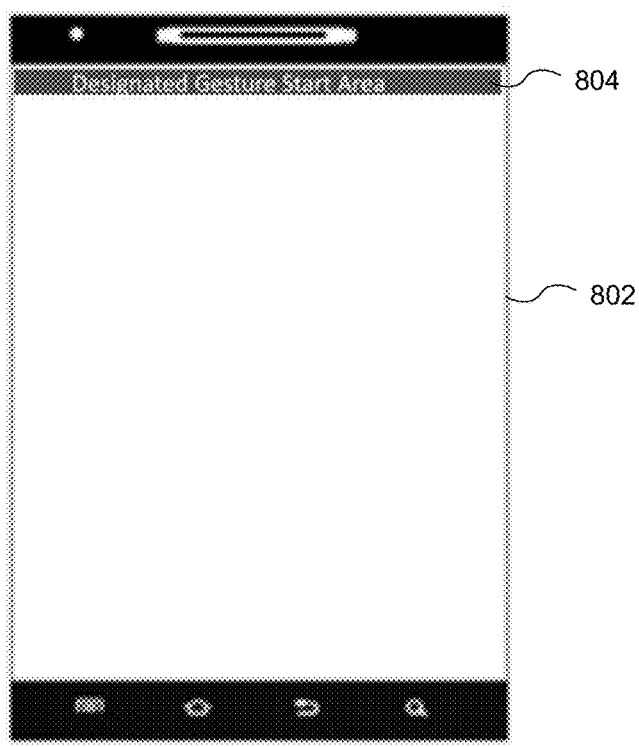
FIG. 8A is a conceptual view of a display and user interface of a capacitive touch screen device showing a region of the touch screen designated for initiating of a touch gesture to enable normal operation of the capacitive sense array in accordance with the method of FIG. 6.

FIG. 8A is a conceptual view of a display and user interface of a capacitive touch screen device 800 showing a region 804 of the touch screen 802 designated for initiating of a touch gesture to enable normal operation of the capacitive sense array in accordance with the method of FIG. 6. In the illustrated implementation, a user must start the pre-defined gesture to enable normal touch screen operation in the region 804 in order to satisfy heuristic 2 presented above.

Figure 8B:
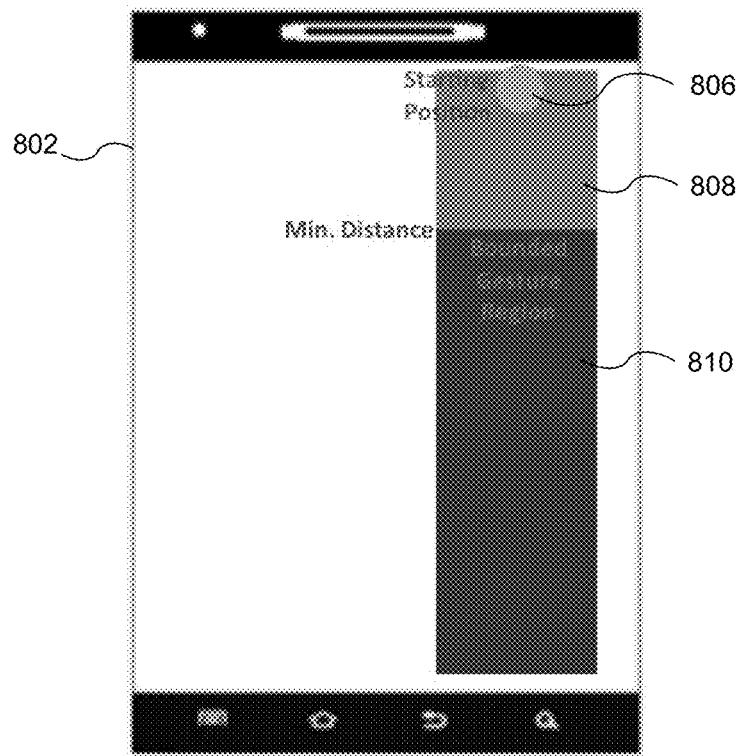
FIG. 8B is a conceptual view of a display and user interface of a capacitive touch screen device showing regions of the touch screen designated for completing the touch gesture of FIG. 8A to enable normal operation of the capacitive sense array in accordance with the method of FIG. 6.

FIG. 8B is a conceptual view of a display and user interface of a capacitive touch screen device showing regions of the touch screen designated for completing the touch gesture of FIG. 8A to enable normal operation of the capacitive sense array in accordance with the method of FIG. 6. In the illustrated implementation, the user's touch gesture must travel at least a minimum predefined distance (e.g., past the shorter window 808) and have a touch gesture trajectory that stays within the longer predefined window 810 in order to satisfy the heuristics 2 and 3 presented above. An additional velocity heuristic could also be a completion condition for the gesture (e.g., complete the gesture with a velocity that lies within a predefined window selected to avoid false gesture detection).

In some implementations, the example gesture of FIG. 8 (chosen as it is natural to many smart phone users) originates within the top 5 mm of the touchscreen (region 804, FIG. 8A) and is a pan-down gesture made with one-finger. The pan-gesture is bounded, such that the trajectory of the finger must stay within a 20 mm (+/−10 mm) x-axis window from the starting x-axis position (region 810, FIG. 8B). Additionally, the touch must travel at least 30 mm for the gesture to be recognized ("Min. Distance" region 808, FIG. 8B). The size of the originating area and window are configurable for each embodiment depending on system design preference. In addition, different gestures can defined consistent with the goal of rejecting false gestures that might be detected due to proximity of ears, hair, etc. when a touch sensitive device is in proximity mode.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of controlling suppression for a capacitive sense array, comprising:
at an electronic system including a touch panel, one or more processors and memory storing one or more programs for execution by the one or more processors:
measuring capacitance on a plurality of capacitance sensing electrodes of the touch panel;
detecting a non-capacitance input indicating movement of the touch panel;
determining whether the detected non-capacitance input indicates movement towards a user's face;
in accordance with a determination that the detected non-capacitance input indicates movement towards the user's face, using a touch controller coupled to the touch panel to suppress touch signals that are extracted from the touch panel except for a designated portion of the plurality of capacitance sensing electrodes while maintaining proximity detection on the entire touch panel, wherein proximity detection detects proximity of the user's face to the touch panel; and
while suppressing touch signals that are extracted from the touch panel except for the designated portion:
detecting a touch input that originates from a first location on the touch panel within the designated portion and extends to a second location on the touch panel; and
in response to determining that a distance from the first location to the second location is greater than a predefined minimum distance, enabling touch detection on the entire touch panel while maintaining proximity detection.

2. The method of claim 1, further comprising in accordance with a determination that the detected non-capacitance input does not indicate movement towards the user's face, maintaining proximity detection on the entire touch panel and maintaining touch detection on the entire touch panel.

3. The method of claim 2, wherein the detected non-capacitance input indicates a movement away from the face.

4. The method of claim 1, wherein the designated portion of the plurality of capacitance sensing electrodes is located at a predefined position of the touch panel.

5. The method of claim 1, wherein the designated portion of the touch panel is defined using runtime parameters stored in the memory.

6. The method of claim 1, wherein the designated portion of the touch panel is a top portion of the touch panel.

7. The method of claim 1, wherein the non-capacitance input is received from one or more motion sensors, which indicate rotation or acceleration of the touch panel.

8. The method of claim 7, wherein the one or more motion sensors include at least one of a gyroscope and an accelerometer.

9. An electronic system, comprising:
a touch panel;
one or more processors; and
memory storing one or more programs for execution by the one or more processors, the one or more programs comprising instructions for:
measuring capacitance on a plurality of capacitance sensing electrodes of the touch panel;
detecting a non-capacitance input indicating movement of the touch panel;
determining whether the detected non-capacitance input indicates movement towards a user's face;
in accordance with a determination that the detected non-capacitance input indicates movement towards the user's face, using a touch controller coupled to the touch panel to suppress touch signals that are extracted from the touch panel except for a designated portion of the plurality of capacitance sensing electrodes while maintaining proximity detection on the entire touch panel, wherein proximity detection detects proximity of the user's face to the touch panel; and
while suppressing touch signals that are extracted from the touch panel except for the designated portion:

detecting a touch input that originates from a first location on the touch panel within the designated portion and extends to a second location on the touch panel; and in response to determining that a distance from the first location to the second location is greater than a predefined minimum distance, enabling touch detection on the entire touch panel while maintaining proximity detection.

10. The electronic system of claim 9, wherein the designated portion of the plurality of capacitance sensing electrodes is located at a predefined position of the touch panel.

11. The electronic system of claim 9, wherein the designated portion of the touch panel is defined using runtime parameters stored in the memory.

12. The electronic system of claim 9, wherein the designated portion of the touch panel is a top portion of the touch panel.

13. A non-transitory computer readable storage medium storing one or more programs configured for execution by one or more processors of an electronic system, the one or more programs comprising instructions for:

at an electronic system including a touch panel:
measuring capacitance on a plurality of capacitance sensing electrodes of the touch panel;
detecting a non-capacitance input indicating movement of the touch panel;
determining whether the detected non-capacitance input indicates movement towards a user's face;
in accordance with a determination that the detected non-capacitance input indicates movement towards the user's face, using a touch controller coupled to the touch panel to suppress touch signals that are extracted from the touch panel except for a designated portion of the plurality of capacitance sensing electrodes while maintaining proximity detection on the entire touch panel, wherein proximity detection detects proximity of the user's face to the touch panel; and
while suppressing touch signals that are extracted from the touch panel except for the designated portion:

detecting a touch input that originates from a first location on the touch panel within the designated portion and extends to a second location on the touch panel; and in response to determining that a distance from the first location to the second location is greater than a predefined minimum distance, enabling touch detection on the entire touch panel while maintaining proximity detection.

14. The non-transitory computer readable storage medium of claim 13, wherein the one or more programs further comprises instructions for:

in accordance with a determination that the detected non-capacitance input does not indicate movement towards the user's face, maintaining proximity detection on the entire touch panel and maintaining touch detection on the entire touch panel.

15. The non-transitory computer readable storage medium of claim 13, wherein the non-capacitance input is received from one or more motion sensors of the electronic system, wherein the one or more motion sensors indicate rotation or acceleration of the touch panel.

16. The non-transitory computer readable storage medium of claim 15, wherein the one or more motion sensors include at least one of a gyroscope and an accelerometer.

17. The method of claim 1, wherein enabling touch detection on the entire touch panel is further in response to determining that the detected touch input traverses the distance from the first location to the second location with a predefined velocity.

18. The electronic system of claim 9, wherein enabling touch detection on the entire touch panel is further in response to determining that the detected touch input traverses the distance from the first location to the second location with a predefined velocity.

19. The non-transitory computer readable storage medium of claim 13, wherein enabling touch detection on the entire touch panel is further in response to determining that the detected touch input traverses the distance from the first location to the second location with a predefined velocity.

* * * * *